United States Patent [19]

Beck

[11] 3,935,904
[45] Feb. 3, 1976

[54] METHOD AND APPARATUS FOR AUTOMATICALLY HARVESTING AND STACKING SOD

[76] Inventor: Martin Beck, P.O. Box 752, Auburn, Ala. 36830

[22] Filed: Apr. 19, 1974

[21] Appl. No.: 462,468

[52] U.S. Cl. ............................... 172/20; 214/6 DK
[51] Int. Cl.² ................... A01B 45/04; B65G 57/00
[58] Field of Search ....... 172/19, 20; 214/6 B, 6 DK

[56] References Cited
UNITED STATES PATENTS

| | | | |
|---|---|---|---|
| 3,667,628 | 6/1972 | Cabler et al. | 214/6 DK |
| 3,672,452 | 6/1972 | Miner | 172/19 |
| 3,675,793 | 7/1972 | Wetzel | 172/20 X |
| 3,807,505 | 4/1974 | Nunes | 172/20 |

Primary Examiner—Stephen C. Pellegrino
Attorney, Agent, or Firm—Jones, Tullar & Cooper

[57] ABSTRACT

A method and apparatus for harvesting and stacking sod is disclosed. A reciprocating cutter bar cuts strips of sod while a vertically moveable blade cuts these strips into blocks of the desired length. The blocks of sod are guided onto an inclined conveyor which carries them to the top of a sod stacker having a plurality of normally closed trap doors. The blocks of sod are guided onto the stacker in alignment with the trap doors and are moved across the upper surfaces of the doors by means of sod advancing chains until they are in position to be stacked. A trip mechanism responds to the position of the sod blocks to release the trap doors, causing the blocks to drop downwardly through the doors onto a pallet supported on a fork lift immediately below the trap doors. As the sod falls through the trap doors, a hydraulic lift recloses them for receipt of the next block. The pallet is adjustable to maintain the desired spacing between the top of the stack of sod and the trap doors and is removed from the stacker when full. In a preferred embodiment, the apparatus cuts and stacks three adjacent strips of sod, and means are provided at the stacker for securing the resulting three stacks together to retain them in position on the pallet.

16 Claims, 8 Drawing Figures

3,935,904

METHOD AND APPARATUS FOR AUTOMATICALLY HARVESTING AND STACKING SOD

BACKGROUND OF THE INVENTION

The present invention relates, in general, to a method and apparatus for harvesting sod, and more particularly to a system for cutting sod into a plurality of side-by-side strips, cutting the strips transversely into predetermined lengths, or blocks, conveying the side-by-side blocks to the top of an automatic stacker, and periodically operating the stacker to deposit the blocks in corresponding stacks on a pallet.

The art of harvesting sod is well-developed, and numerous machines have been developed for this purpose. Typically, a sod harvesting machine includes a reciprocating or vibrating cutting bar which has a bottom horizontal blade designed to sever the sod from the ground at a selected depth, and two vertical side blades, one at each end of the horizontal blade, to cut the sod in a strip of the desired width. Such cutter bars are generally mounted on a suitable frame and are driven by a mechanical drive mechanism so that as the frame is advanced the bar reciprocates to undercut the sod. As illustrated in the copending application Ser. No. 314,310 of Martin Beck, filed Dec. 12, 1972 and entitled "Ganged Sod Harvesting Apparatus", such a sod cutting mechanism may incorporate three cutting bars operable to produce three adjacent strips of sod.

The major problem encountered in sod harvesting systems, however, is in the handling of the sod strips after they have been cut. Conventionally, the strips of sod are cut into predetermined lengths by periodically downwardly driving a transverse cutting blade. These lengths of sod are picked up by an attendant following the harvesting machine, formed into a roll or folded in half, and manually stacked on a pallet for transportation to the place of use. Not only is this procedure inefficient and time-consuming, but the rising costs of labor dictate that it be automated to the greatest possible extent.

Various machines and methods have been developed to carry out this stacking procedure automatically. For example, a machine has been developed which automatically picks up the cut lengths of sod and rolls them into a bundle. An attendant standing behind the end of the conveyor-roller machine lifts each bundle off the conveyor and deposits it on a pallet which may be carried by a fork-lift device. Although this reduces the time and work involved in forming rolls of sod, it still requires the presence of an attandant to lift and stack each roll, and thus does not overcome the labor problem of the prior art. In copending application Ser. No. 57,930 of Martin Beck, filed July 24, 1970 and entitled "Method and Apparatus for Sod Harvesting and Laying", a method and apparatus for rolling previously cut strips of sod onto a reel is disclosed, thereby eliminating the need for an attendant to manually lift each block of sod as it is cut. Various other machines for forming and stacking rolls of sod are known in the art. However, these prior devices do not take into account the fact that some types of sod cannot conveniently be formed into rolls, and further do not take into account the fact that many customers who purchase sod prefer to purchase it in an unrolled condition. Accordingly, there is a real need in the sod-harvesting art for a machine for automatically picking up strips of sod and stacking them on a pallet without the need for manual rolling, lifting, or other handling by an attendant. The present invention provides such a machine.

SUMMARY OF THE INVENTION

It is, therefore, an object of the present invention to provide a sod harvesting apparatus which will automatically cut and stack strips of sod.

It is another object of the invention to provide a method of harvesting sod wherein said is cut transversely and into strips to form blocks of predetermined length, picked up from the ground and conveyed to a stacker, and automatically stacked on a pallet, without the need for manual handling of the sod.

It is a further object of the invention to provide an automatic sod stacker which receives cut lengths of sod and automatically deposits them sequentially in a stack.

It is further object of the invention to provide an automactic stacker which receives a plurality of blocks of sod and deposits them substantially simultaneously in corresponding stacks.

It is a further object of the invention to provide a sod stacker which receives lengths of sod and deposits them in one or more stacks on a pallet, whereby when the stacks are completed, they may be removed from the stacker and transported to a point of use without manual handling of the sod.

It is another object of the invention to provide a sod harvesting machine which includes means for cutting, conveying and stacking strips of sod automatically, efficiently and at a greater rate of speed than was heretofor possible.

Briefly, the harvester of the present invention includes a self-propelled framework which can be steered and operated by a driver, or, if desired, a framework which is adapted to be mounted on or towed by a conventional tractor or other drive vehicle. At the forward part of the framework, either formed as an integral part thereof or comprising a separate machine mounted by a conventional three-point hitch, is a sod-cutter mechanism which preferably is of the type described in my aforesaid patent application Ser. No. 314,310. Located immediately in front of the cutter mechanism is a vertically moveable cut-off blade which is driven to cut the strips produced by the cutter mechanism into blocks of desired lengths. The cutter mechanism incorporates reciprocating cutter bars which sever segments of sod from the ground. These segments of sod are directed onto a suitable conveyor mechanism, which is also carried by the machine frame, and are carried by the conveyor upwardly and rearwardly toward the top of a sod stacker mechanism which operates to stack the sod blocks on a pallet or similar carrier. In a preferred embodiment of the invention, three side-by-side strips of sod are produced by the cutter as the harvester advances, and accordingly three adjacent blocks are carried up the conveyor and substantially simultaneously positioned on the stacker.

At the upper end of the conveyor a sod puller, consisting of a plurality of chains having metal fingers extending therefrom to engage the upper surface of the sod, slides the lengths of sod across the upper surface of the sod stacker and into position over a stacking chute. As the blocks are positioned on the stacker, they strike corresponding tripper arms to operate trap door plates which pivot downwardly under the weight of the sod and allow the sod to drop down onto a pallet or other suitable receiver. The trip mechanism holds the doors open long enough to allow the blocks to clear the door plates, after which a hydraulically operated lift bar returns the plates to their horizontal positions where they are held to receive the next blocks of sod. A hydraulic fork lift mechanism mounted to the machine frame supports the pallet and adjusts its position so that the top of the sod stacks are just below the trap doors of the stacker, whereby the sod will fall only a short distance. As the blocks of sod accumulate, the pallet is lowered so that all blocks fall approximately the same distance, thereby assuring accurate stacking.

Since the sod blocks are formed in relatively narrow elongated strips, for example 12 and 16 inches wide, the resulting stacks may be unstable and difficult to handle; accordingly, the present invention contemplates the provision of means for tying the adjacent stacks together. This may be accomplished very simply by passing strings of twine across successive layers of sod, transversely to the lengths of strips. These lengths of twine may then be tied together to hold the stacks upright. More complex methods of tying together the side-by-side stacks may be provided, if desired. When full, the pallet may easily be removed from the machine by lowering the fork lift device to rest the pallet on the grond and advancing the harvester, or by transferring the pallet to a fork lift truck.

Thus, the present apparatus provides means whereby strips of sod may be stacked quickly and conveniently on a pallet, removed from the machine, and delivered to a point of use without any need for manual handling of the sod. The complete automation of this process eliminates the time-consuming hand-stacking of rolls or strips, enables larger and heavier strips to be easily stacked, reduces the work force required to produce the stacked sod, and thereby reduces the costs involved.

BRIEF DESCRIPTION OF THE DRAWINGS

The foregoing and additional object, features and advantages of the invention will become evident from a consideration of the following description of a preferred embodiment taken in conjunction with the accompanying drawings, in which.

DESCRIPTION OF PREFERRED EMBODIMENT

Figure 1:
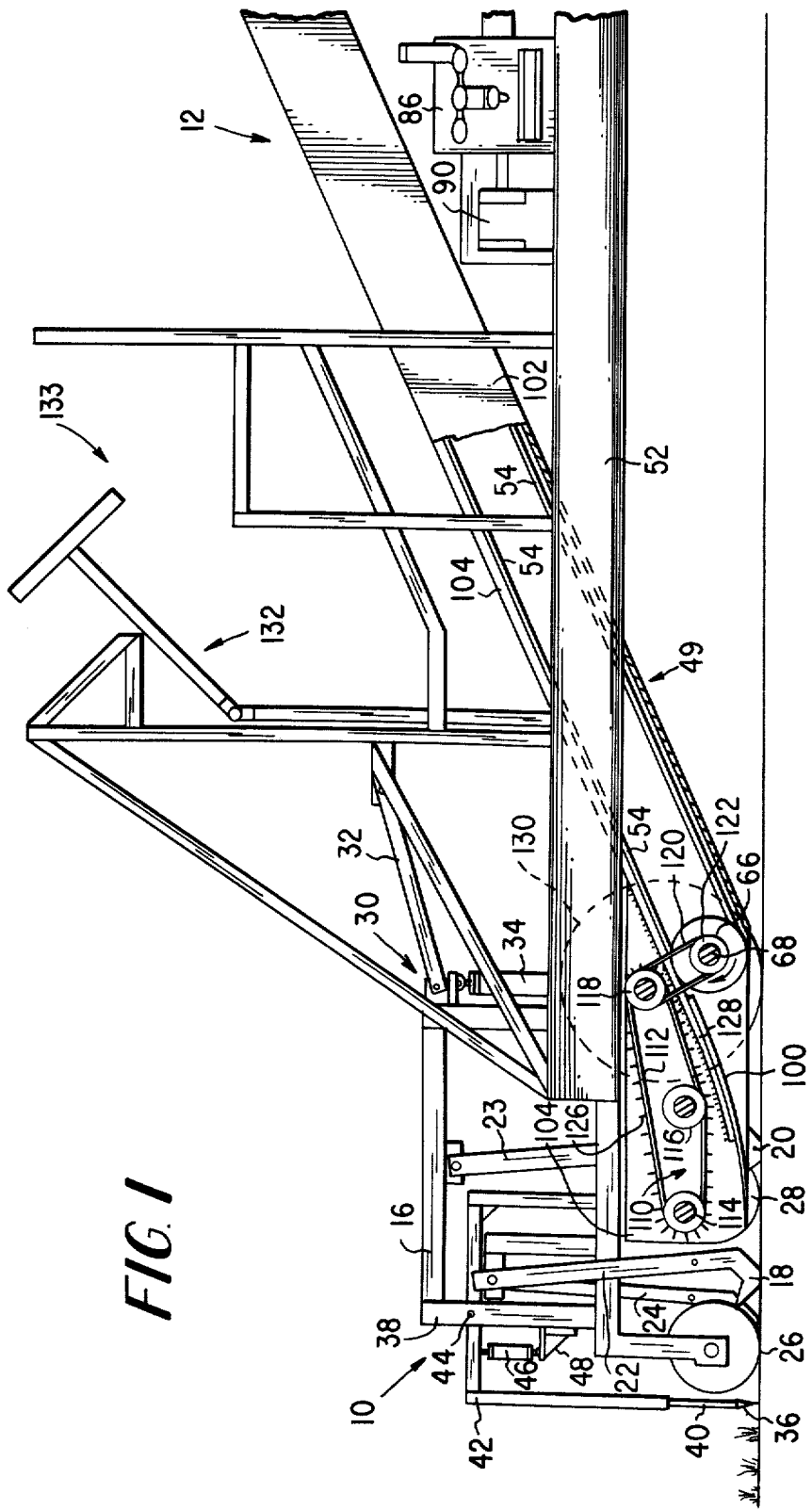
FIGS. 1 and 2 provides a diagrammatic illustration in side view of a sod harvesting and stacking system in accordance with the present invention.
Figure 2:
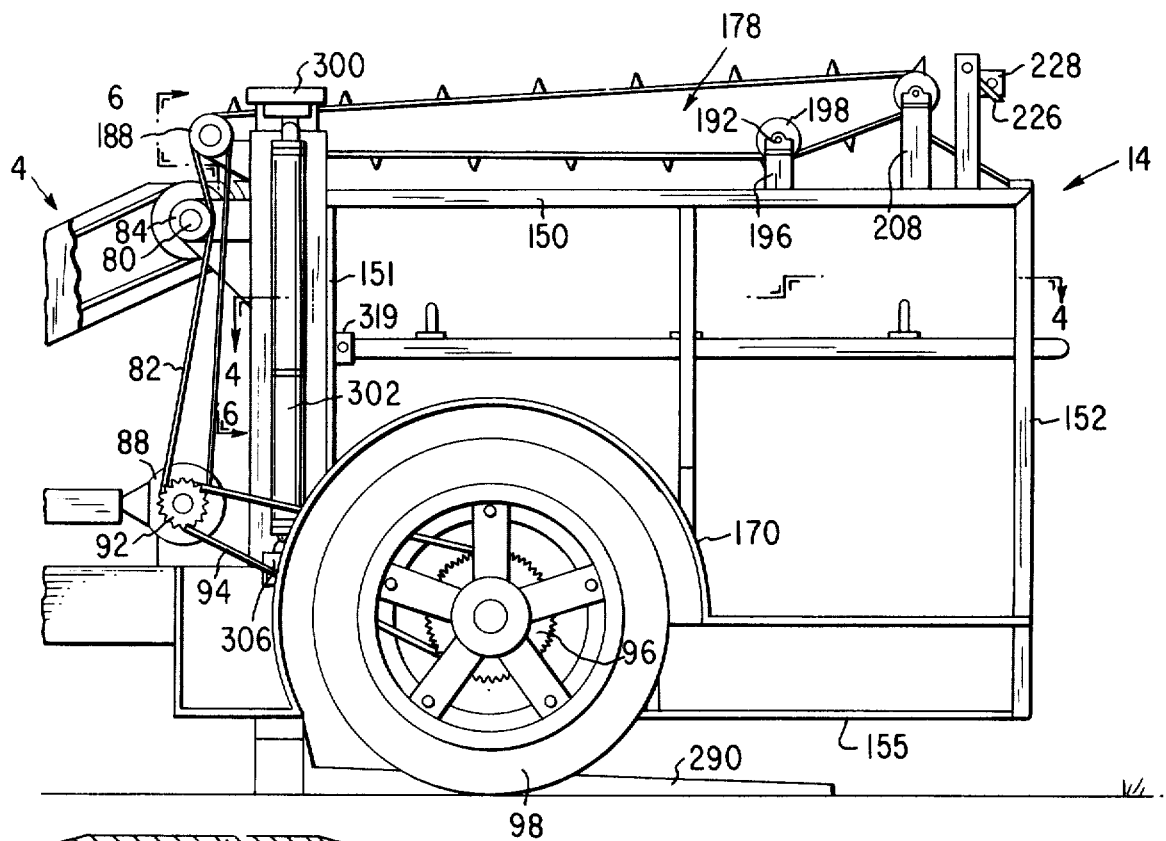

Turning now to a more detailed consideration of the present invention, there is illustrated in FIGS. 1 and 2 in diagrammatic form a preferred embodiment of the sod harvesting and stacking system of the present invention and particularly illustrating the stacking unit which constitutes the primary features of the system.

As illustrated in this figure, the system includes three general components which may be constructed as a single operating unit or which may be separate units interconnected so as to operate as a single unit and, in the preferred form, to be capable of being operated from a single power source. The forwardmost component of the harvester system is a cutter assembly generally indicated at 10, which is adapted to undercut the sod to free it from the underlying soil. The cutter includes a vertical cutting blade which cuts the sod tranversely before it is cut free from the soil, so that the resulting blocks of sod are of predetermined lengths for easier handling. The second component of the system is a conveyor assembly indicated generally at 12 and comprising power driven means for lifting the cut sod strips from the ground and transferring them to the third component of the system, which is a stacker assembly generally indicated at 14 and forming the rearward portion of the harvesting and stacking system.

It will be understood that the system as illustrated in the drawings is diagrammatic in form to demonstrate the relationship between the various components, and that modifications may be made depending upon the exact manner in which the system is to be operated to perform its harvesting and stacking functions. Thus, for example, if the system is to be mounted on or towed by a tractor which will serve to propel it across the sod which is to be cut, and which will provide driving power to the mechanism through a conventional power take-off, the required support framing, support wheels, and the like will be of somewhat different construction than if the unit is to be self-contained. In the latter event, it will be apparent that the system will have to be provided with a suitable engine for providing the necessary motive power, and will as well require the provision of suitable running gear, steering mechanisms, and hydraulic systems for proper operation. Since such particulars are within the skill of the art, for clarity of illustration they are not shown in detail in the accompanying drawings; however, the drawings do illustrate in general a self-contained system.

The cutter assembly 10 is similar to the ganged sod harvesting apparatus illustrated in the aforementioned copending U.S. patent application Ser. No. 314,310, but modified so as to be securable to the harvesting apparatus by means of a conventional three-point hitch located at the front of the machine frame. The cutter, which may be operated from a hydraulically driven motor, from a rotary power take-off shaft or the like, comprises a suitable frame 16 formed, in the preferred embodiment, by three side-by-side sections ganged together. Each of the side-by-side sections carries a reciprocating cutter bar, such as cutter bars 18 and 20 for the near and center section, respectively, as viewed in FIG. 1, the cutter bars being pivotally secured to the near, center and far sections by drive arms 22, 23 and 24, respectively and driven by corresponding rotary cam driven mechanisms, as illustrated in detail in application Ser. No. 314,310. The cam mechanisms are powered by a suitable motor, such as a hydraulic motor, by way of a drive shaft and chain drives (not shown). Each section of the cutter assembly is supported by a roller which immediately proceeds and provides a cutting depth guide for its corresponding cutter bar. Thus, roller 26 preceeds and guides cutter bar 18, roller 28 preceeds and guides cutter bar 20, and a third roller (not shown) precedes and guides the cutter bar mounted on drive arm 24.

The central section of cutter assembly frame 16 carries a hitch attachment 30 adapted to receive a stabilizer bar 32 pivotally secured to the main frame of the conveyor assembly 12. A pair of spaced lower hitch attachments (not shown) are adapted to receive lift bars also pivotally connected to the conveyor assembly frame and a suitable hydraulic lift cylinder 34, secured to the conveyor frame serves to move the lift bars in a vertical direction to raise and lower the the cutter assembly 10. As the cutter assembly 10 is advanced during operation of the harvester, its hydraulic motor is operated to drive the cutter bars 18 and 20 seen in FIG. 1, as well as the third cutter bar not shown, in a reciprocating motion, causing the bars to undercut three adjacent strips of sod. The thickness of the sod strips is controlled by the rollers 26 and 28, by the connection point of the cutter bars to frame 16, and by the hydraulic lifter 34, as described in the aforementioned application Ser. No. 314,310.

The continuous strips of sod are cut into suitable lengths by means of a transverse cut-off blade 36 which may be secured to a forward vertical frame member 38 of the cutter assembly framework 16. The cutter blade 36 is mounted on a blade support 40 which extends between and is secured to a pair of pivot arms, one of which is shown at 42, which are pivotally mounted on a transverse bar 44 which extends between and is journalled in vertical frame members or are otherwise secured by a suitable pivotal mounting arrangement on the cutter frame 16. The cutter blade 36 and its support 40 are biased into a generally vertical position by suitable biasing means, and are reciprocated vertically by means of a hydraulic cylinder 46 fixed at one end to the frame 38 by a bracket 48 and secured at its other end to arm 42.

In operation, the cutting and harvesting apparatus illustrated in FIGS. 1 and 2 is advanced (toward the left as viewed in the Figures) and strips of sod are cut loose from the underlying soil by the reciprocating cutter blades, as explained in application Ser. No. 314,310. The hydraulic cylinder 46 is operated to normally hold the cutter blade 36 free of the sod and periodically to force it downwardly into the sod cutting the sod transversely to the direction of motion of the harvester. As the harvester continues to move forward, the cylinder 46 is operated to lift the blade free of the sod and position it for a subsequent cut. The motion of the hydraulic cylinder and the lever arms 42 are selected so that blade 50 penetrates at least as far into the ground as the thickness of the sod layer being undercut by the cutting assembly 10. During this forward motion of the harvester, the drive arms 22, 23 and 24 are reciprocated to cut three side-by-side sod strips of predetermined width free of the soil each strip being of a length determined by the operation of the cutter bar 36.

The conveyor assembly 12 may, in one embodiment, incorporate three conventional conveyor sections 49, 50 and 51 (see FIG. 3) suitably secured and journalled in a main frame assembly 52 for lifting sod from ground level to the top of stacker assembly 14; however, it will be apparent that a single wide conveyor section may be utilized, if desired, to carry the three side-by-side strips, with appropriate changes being made in the conveyor construction illustrated herein. The conveyor may be of any conventional type, and in particular may be of a chain-type construction similar to that illustrated in U.S. Pat. No. 3,509,944 to Brouwer et al or of a belt-type construction such as that illustrated herein. Thus, the conveyor may comprise a plurality of continuous belts 54–62 (see FIG. 3) arranged in side-by-side parallel relationship, the lower ends of the belts passing around the lower idler pulleys or sprockets, such as the sprocket 66, mounted in spaced relationship along a lower transverse shaft 68. The shaft may be common to all three sections of the conveyor assembly, or may be in three parts, one for each section. The shaft, or shafts, may be journalled by means not shown in the conveyor frame 52, or may be otherwise supported to secure the lower end of the conveyor in position for receiving blocks of sod. The upper ends of the belts (FIG. 3) pass around corresponding drive sprockets 70–78, mounted in side-by-side spaced relation on upper drive shaft 80. The upper shaft 80 is powered through a drive chain 82 and sprocket 84 by means of a suitable hydraulic motor or other power source 86 and suitable gearing 88.

The power source 86, which may, for example, be a gasoline engine, is mounted on the main frame 52 and operates not only to drive the conveyor, but to provide hydraulic pressure, as by means of hydraulic pump 90, to operate the hydraulic cylinder 46 for the cut-off blade as well as other hydraulic equipment to be described. The power source also provides motive power for the harvesting machine by way of gear mechanism 88, drive sprocket 92, drive chain 94, and a second drive sprocket 96 on the rear wheel 98 which serves to support the rear of the machine and in particular the stacker section 14 (FIG. 2). The gearing ratios of the drive assembly for the conveyor 50 and for the main drive wheel 98 are so arranged that the linear speed of the conveyor is slightly greater than the forward speed of the harvesting machine, whereby blocks of sod picked up sequentially by the conveyor will be separated as they move onto the conveyor to provide sufficient time between successive strips of sod to permit stacking. The vertical reciprocation of the cutter blade 36 is synchronized with the forward movement of the harvesting machine to cut the blocks of sod to the desired lengths.

Secured at the lower end of conveyor section 49 and extending forwardly therefrom is a guide, or scoop-like attachment 100 (FIG. 1) which serves to pick up strips of sod which have been cut loose from the ground and to guide them onto the conveyor. A similar scoop is provided for each of the conveyor sections and is aligned with a corresponding one of the cutter bars of the cutting assembly 10, with the guide 100 being shown in conjunction with cutter bar 18 and the remaining guides not being shown. As illustrated, the guide extends to a point just behind the cutter bar assembly and may be lowered to a position just at ground level to lift up the sod which has been cut free so that the forward motion of the machine causes the sod to slide upwardly toward the conveyor.

Figure 3:
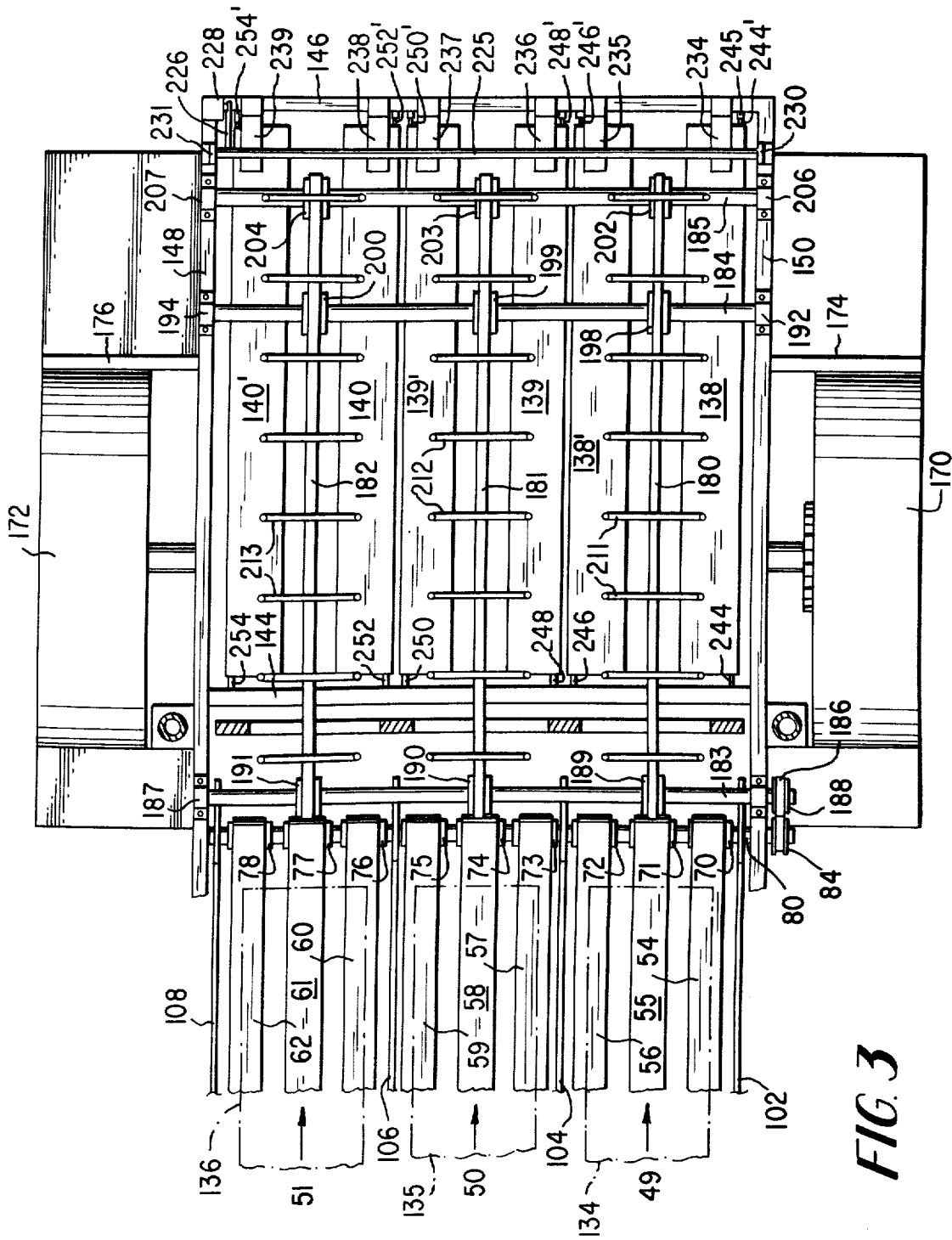
FIG. 3 is a top view of the sod stacker portion of the apparatus of FIG. 2.

Conveyor section 49 may be provided with side plates 102 and 104 which may surround the conveyor belts to prevent injury, and the guide 100 may be secured to the lower end of these plates. Alternate methods of mounting the guides when side plates are not provided will be apparent. The plates 102 and 104 are secured to the main frame 52, with plate 104 serving, in the illustrated embodiment, to separate the three conveyor belts 54, 55 and 56 from the belts of the adjacent conveyor section, thereby defining the section which is adapted to pick up and carry the strip of sod cut by the cutter bar 18. Of course, where a single conveyor belt is used to carry all three strips, such intermediate plates are not used. These plates may be limited to the lower end of the conveyor so as to shield and support the lower portion of the conveyor mechanism, or may extend the full length of the conveyor, as illustrated in FIGS. 1, 2 and 3, terminating at the upper end of the conveyor adjacent the stacking mechanism. It will be understood that each of the remaining two sections of the conveyor mechanism may similarly be shielded by side plates 106 and 108 (FIG. 3) with the corresponding guides at their lower ends being arranged to cooperate with the remaining two cutter bars of the three-section cutting assembly.

Figure 5:
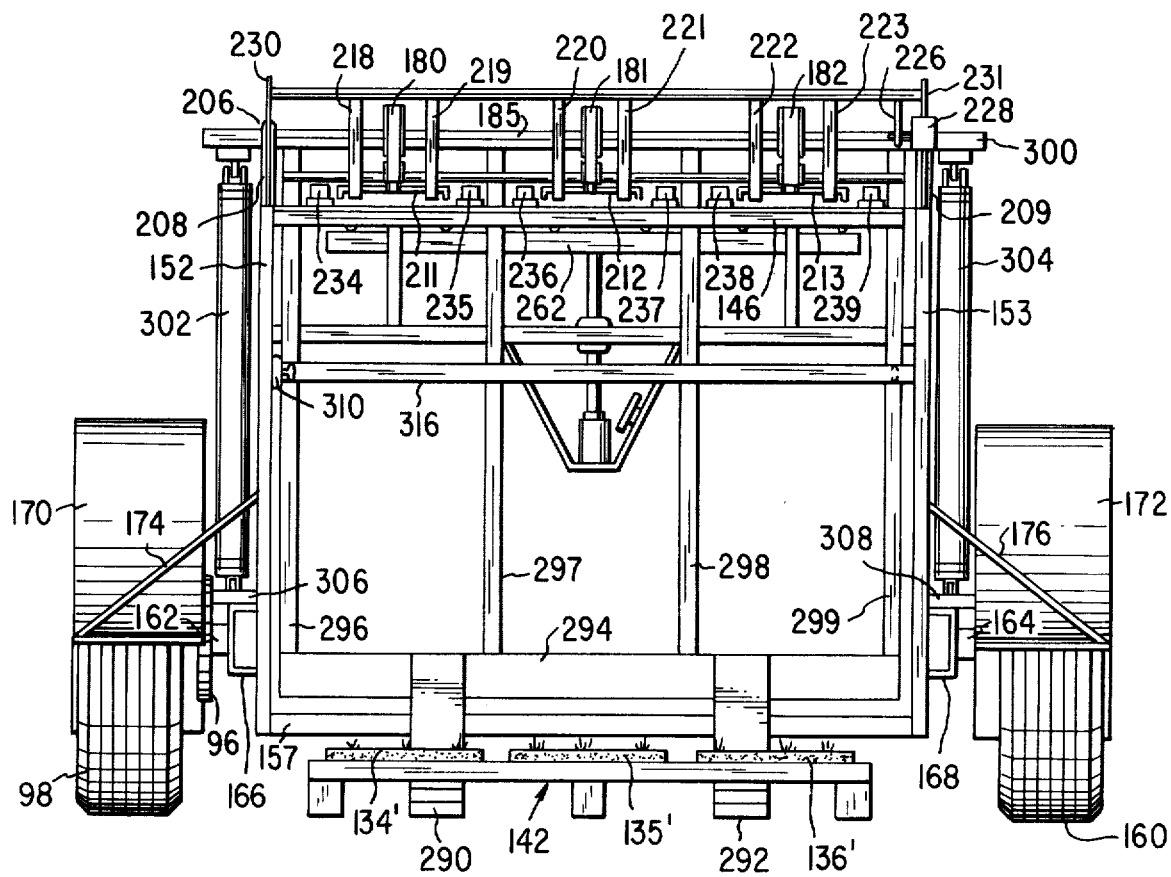
FIG. 5 is a rear view of the sod stacker of FIG. 2.
Figure 8:
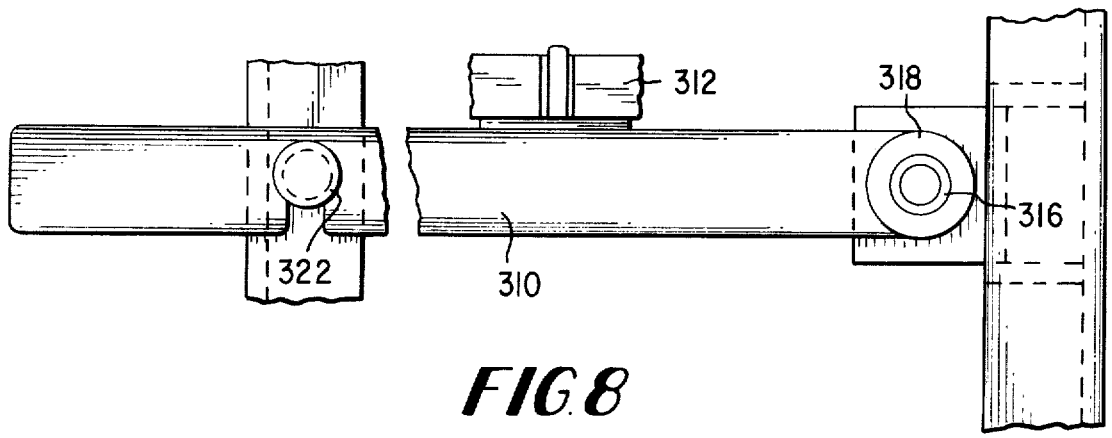
FIG. 8 is a partial diagrammatic illustration of the sod stack tying mechanism, taken along lines 8—8 of FIG. 6.

To assist in drawing the sod blocks or strips onto the conveyor, a sod transporter, generally indicated at 110 for conveyor section 49, is provided at the lower end of each conveyor section or, where a single conveyor is provided, one transporter is provided for each strip of sod. The transporter 110 comprises an endless chain or belt 112 mounted on a series of three pulleys 114, 116 and a double pulley 118 journalled on corresponding shafts mounted between the side plates 102 and 104. The chain 112 preferably is driven by the conveyor drive mechanism through a belt 120 driven by a drive pulley 122 mounted on the conveyor shaft 68, and the second portion of pulley 118. As an alternative, the transporter may be driven by a follower wheel in contact with the ground so that as the harvesting machine moves in a forward direction (from right to left as viewed in FIG. 1), the wheel (not shown) would be rotated to drive the chain 112 through a suitable pulley and belt drive mechanism at a speed equal to or slightly greater than the linear forward speed of the machine. Chain 112 is provided with a series of spikes 126 which serve to engage strips of sod, such as the strip 128 illustrated in FIG. 1, and to carry the strips from the guide plate 100 to the upper run of the conveyor; i.e. onto the conveyor belts 54, 55 and 56 (FIG. 5). It will be understood that three such transporters are provided in the preferred embodiment of the harvester, one for each of the three side-by-side strips of sod being harvested and carried to the corresponding conveyor sections.

As diagrammetically illustrated in FIG. 1, the forward end of the harvesting machine may be supported on suitable wheels, such as the forward wheel 130, secured to the main frame 52 in known manner. These forward wheels may be steerable to control the direction of the machine during the harvesting operation. For this purpose, a conventional steering mechanism generally indicated at 132 may be provided at a suitable operator's location 133 on the main frame. Also at the operator's location are the various drive motor controls (not shown) as well as suitable hydraulic and electrical controls by means of which the machine operator can monitor and control the machine operation.

Figure 4:
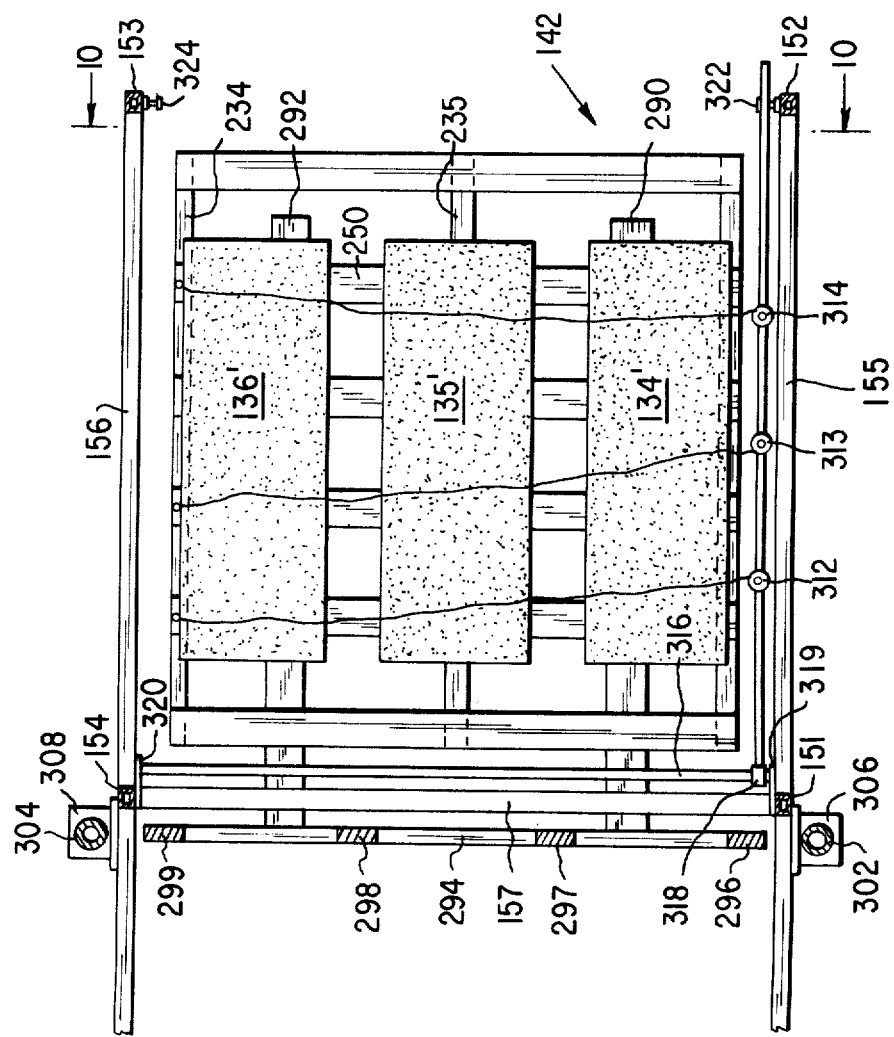
FIG. 4 is a view of the sod stacker and pallet portion of the harvester apparatus taken along line 4—4 of FIG. 2.

The three strips of sod cut by the cutter assembly delivered to the three conveyor sections 49, 50 and 51 by the respective sod transporter chains are carried upwardly by the conveyor and are delivered at the top end thereof to the stacking assembly generally indicated at 14 in FIG. 2. As shown in FIG. 3, three blocks of sod, generally indicated at 134, 135, and 136, arrive at the top of the conveyor sections 49, 50 and 51, respectively at approximately the same time and are propelled onto the upper surface of the stacking assembly. As may be seen in FIG. 3, the top surface of the stacker is made up of three sets of hinged doors or panels, 138—138', 139—139', and 140—140', with each pair of doors forming the top of a sod dropping chute. The sets of doors for each chute are normally held closed by a hydraulic lift bar, to be described, and are opened by an automatic trip mechanism when a strip of sod is in position on the top of each door to open and drop sod downwardly onto a pallet 142 located just below the doors. Although each set of doors may be operated independently by a corresponding tripping mechanism, in a preferred embodiment, a single trip mechanism operates when all of the sod strips are in position to drop them all at once. As seen in FIGS. 4 and 5, the pallet 142 is positioned within the stacker by a hydraulically operated fork lift, to be described, at a suitable distance below the trap doors and thus receives the sod strips 134', 135' and 136' and subsequent strips dropped through the trap doors.

The trap doors extend longitudinally along the stacker and are pivotally secured between forward and rearward transverse frame members 144 and 146, which members are, in turn, secured to longitudinal upper frame members 148 and 150 (FIG. 3). The stacker frame members 148 and 150 may be formed as an extension of time frame work of the conveyor assembly or may be independent thereof, depending upon whether the stacker is an independent unit attached to and towed by the conveyor unit or is to be an integral part thereof. In the present embodiment, the stacker assembly 14 is shown as being an integral part of the harvester machine, but it should be recognized that it may be an independent component of the harvester.

The upper frame members 144, 146, 148 and 150 are supported by vertical frame members, or posts, such as the vertical corner posts 151, 152, 153 and 154, illustrated in FIGS. 2, 3, 4, 5 and 6. These vertical posts are, in turn, carried by lower longitudinally extending frame members 155 and 156, and a forward lower transverse frame member 157 of the assembly. It will be apparent that additional support posts, cross braces, and the like, will be utilized as required to provide a sturdy, stable unit capable of handling the weight of a large number of blocks of sod and of withstanding the stresses and strains of operation over uneven terrain. As indicated in the drawings, the stacker assembly may be supported by suitable wheels 98 and 160 (FIG. 5) mounted by means of axles 162 and 164, respectively, to suitable frame members 166 and 168. As illustrated, the wheels may be covered by fenders 170 and 172 secured to the stacker frame by suitable means such as the braces 174 and 176.

Secured to the upper frame members and supported above the trap doors 138, 139 and 140 of the stacker assembly 14 is a sod puller generally indicated at 178 which is adapted to assist the conveyor sections 49, 50 and 51 in propelling the blocks of sod across the sod stacker and into position over the trap doors. The sod puller consists of three chains 180, 181 and 182 aligned with the center of the conveyor sections 49, 50 and 51, respectively. The chains are mounted on pulleys carried by transversely extending shafts 183, 184 and 185 which are journalled in suitable bearing blocks mounted on the stacker frame. As may be seen in FIGS. 2, 3, 5 and 6, the forward chain supporting shaft 183 is mounted on bearing blocks 186 and 187. This shaft is driven by means of a pulley 188 which receives the drive belt 82 (FIG. 2), and carries drive sprockets 189, 190 and 191 on which the sod puller chains 180, 181 and 182, respectively, are mounted.

The intermediate idler shaft 184 is secured to the stacker frame by means of bearing blocks 192 and 194 supported on the frame by support posts such as that illustrated at 196 in FIG. 2. The height of the two shafts 183 and 184 is such that the lower run of the sod puller chains between these shafts is parallel with the upper surface of the trap doors, so that the sod is pulled evenly and smoothly onto the stacker. Shaft 184 carries idler pulleys 198, 199 and 200 (FIG. 3) which engage chains 180, 181 and 182, respectively.

The rear idler shaft 185 carries idler sprockets 202, 203 and 204 and is supported on the stacker frame by means of bearing blocks 206 and 207, carried on vertical posts 208 and 209. The posts are of sufficient height to raise shaft 185 above the level of shafts 183 and 184 so that the lower run of each of the sod puller chains moves away from the upper surface of the trap doors on the stacker after passing the idler pulleys on shaft 184, as seen in FIG. 2.

Figure 6:
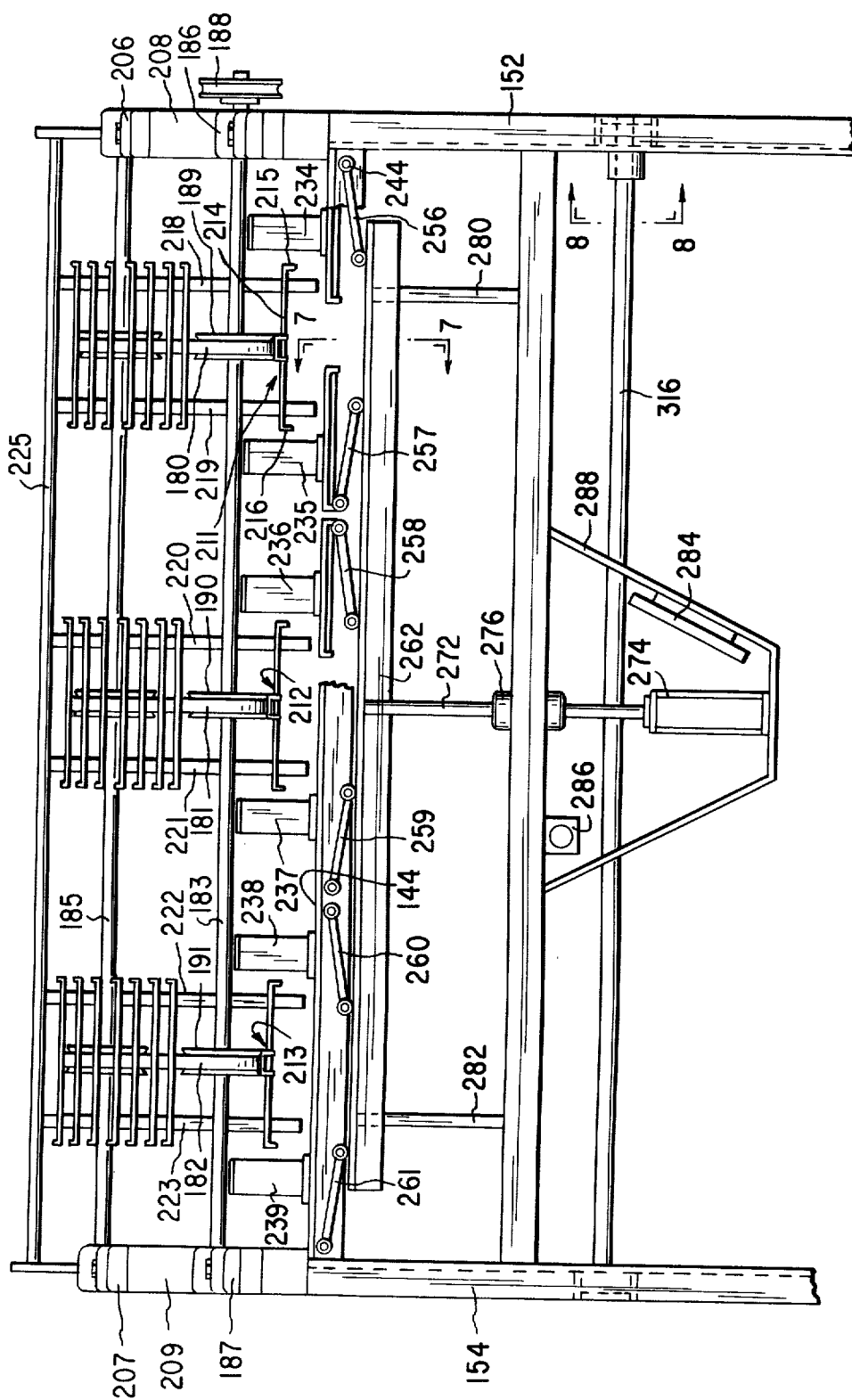
FIG. 6 is a partial view of the sod stacker portion of the harvester apparatus taken along line 6—6 of FIG. 2.

Each of the puller chains is provided with a plurality of metal fingers or spikes, generally indicated at 211, 212 and 213 on chains 180, 181 and 182 respectively, which spikes are spaced along the length of their corresponding chains at intervals of about 6 inches or more. These spikes are secured to the chain in such a way as to pass easily around the drive and idler sprockets and, as shown in FIG. 6, generally comprise a transverse bar portion which is secured at its center to the chain and carries at each end an outwardly directed spike, or finger, such as those indicated at 215 and 216 in FIG. 6. The finger portions 215 and 216 are arranged to face downwardly along the length of the lower horizontal run of the chain, and are sufficiently long to engage the blocks of sod as they arrive at the stacker from the conveyor. The sod puller chains 180, 181 and 182 are driven from the same drive chain as the conveyor sections 49, 50 and 51 and, therefore, operate at approximately the same speed so as to pull the strips of sod from the conveyor across the trap doors forming the upper surface of the stacker. It will be noted that the finger portions of the sod spikes extend over the trap doors rather than over the space between the doors, to prevent the pressure of the spikes from driving the sod down between the doors, which would prevent free movement of the sod onto the stacker.

As seen in FIG. 3, the three side-by-side blocks of sod 134, 135 and 136 are delivered by the conveyor sections 49, 50 and 51, respectively, toward the stacker assembly 14 and are propelled by the combined action of the conveyor sections and the sod puller chains 180, 181 and 182 across the corresponding pairs of trap doors 138—138', 139—139', and 140—140', respectively. The sod puller chains move the blocks completely across the doors until the leading edge of each block of sod strikes a corresponding one of three sets of tripper bars 218–219, 220–221, 222–223. These three sets of tripper bars are secured to, and operate, a transversely extending tripper actuator rod 225 when a block of sod strikes one or more of the tripper bars. Actuation of rod 225 rotates a switch arm 226 associated with a switch 228 which serves to actuate the trap doors to allow the sod to drop down through the doors onto the pallet 142. Thus, when the sod strips are drawn into position on the stacker, one or more of the tripper bars 218 through 223 will serve to rotate actuator bar 225, thereby tripping switch 228 to activate the hydraulic system which controls the position of the doors. It will be noted that the actuator bar 225 is rotatively mounted on the stacker frame by means of vertically extending support brackets 230 and 231.

To insure that the strips of sod are disengaged from the sod spikes 211, 212 and 213 carried by the sod puller, the end of the puller chains 180, 181 and 182 are angled up away from the surface of the sod stacker, as illustrated in FIG. 2, between the idler shafts 184 and 185. This angle withdraws the spikes, or fingers from the sod and allows the leading edge of the sod to slide along the stacker and into contact with the tripper arms. To insure release of the sod, a plurality of sod removers 234 through 239 are provided along the rear edge of the stacker. These removers, which may be of sheet metal or the like welded or bolted to the rear upper frame member 146, extend forwardly from the rear frame member and are angled upwardly toward the sod puller chains adjacent the path of the outwardly extending sod engaging fingers. These sod remover plates serve to strip the sod from the spikes to insure that the sod strips will lie on the trap door and will engage the tripper arms when properly positioned, thereby insuring proper stacking of the sod.

Figure 7:
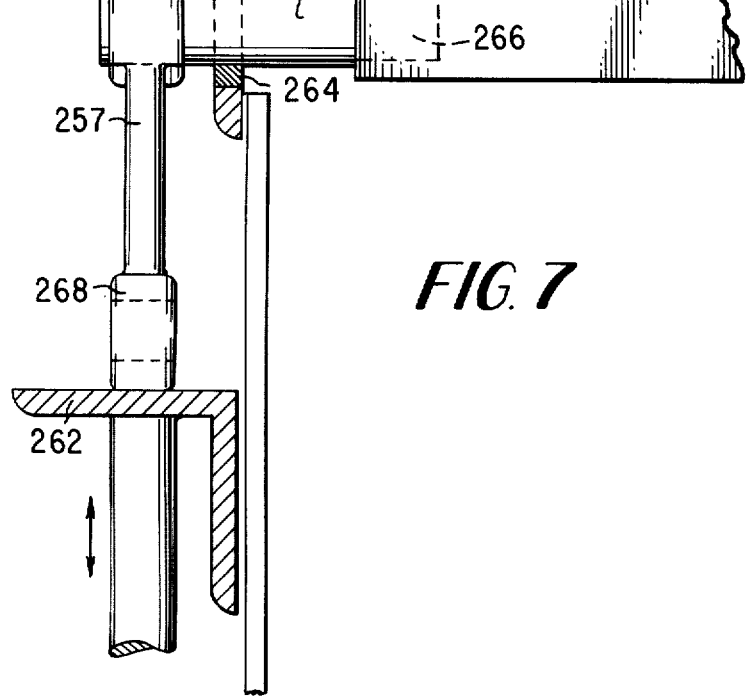
FIG. 7 is a partial diagrammatic illustration of the lift bar used in closing the sod chutes of the apparatus taken along line 7—7, of FIG. 6.

Each of the trap doors forming the upper surface of the stacker is mounted at one of its edges by means of a rotatable hinge bar which is journalled in the stacker frame, whereby when the tripper switch 228 is activated, and the door is released, they will pivot downwardly to form a chute through which the sod falls. After the sod has passed through the open doors, a hydraulically operated lifter bar engages angled lift arms attached to each of the doors to return them to their horizontal positions. As best seen in FIGS. 3 and 7, one end of trap door 138 is mounted to the stacker frame by means of a hinge bar 244, one end of which is journalled in a suitable bearing mounted in frame member 144 and the other end of which is secured as, by welding, to door 138. The opposite end of the door is secured to a corresponding hinge bar 244', the other end of which is, in turn, journalled in a bearing 245 secured to the frame member 146. Although the door 138 is shown as being supported by two relatively short hinge bars, it will be apparent that, if desired, a single bar may be used, with the bar extending the length of the door.

In similar manner, door 138' is mounted in frame member 144 by means of a hinge bar 246 and in frame member 146 by means of hinge bar 246'; door 139 is secured to the stacker frame by means of hinge bars 248 and 248'; door 139 is secured to the frame members by means of hinge bars 250 and 250'; door 140 is mounted in the frame members 144 and 146 by means of hinge bars 252 and 252', respectively; and door 140' is mounted in the frame members by hinge bars 254 and 254'.

Secured to the end of each of the hinge bars 244, 246, 248, 250, 252 and 254 which is journalled in frame member 144 is a corresponding door lift arm, which arms are identified in FIG. 6 at 256 through 261, respectively. Each lift arm is secured at one end of its corresponding hinge bar and carries at its free end a lift roller which is adapted to be engaged by a hydraulically actuated lift bar 262. The lift arms are secured to the hinge bars at an angle with respect to their corresponding door plates so that when the doors are in the horizontal, or closed position, the lift arms extend downwardly at a slight angle, as illustrated in FIG. 6, to contact the top of the lift bar 262. This construction is illustrated in more detail in FIG. 7, where it will be seen that the door section 138' is secured to the hinge bar 246 which is, in turn, journalled in the stacker frame member 144 by means of a suitable bearing 264 whereby the door is freely rotatable. The door preferably is of sheet metal and incorporates suitable angle braces to provide sufficient strength to enable the doors to withstand the weight of the sod strips and the forces applied in opening and closing the doors by means of a hydraulically actuated lift bar 262. As indicated in FIG. 7, the hinge bar 246 may be secured to a bracing element 266 in the door at one end, with the other end extending through bearing 264 to receive the lift arm 257. This arm is secured to the hinge bar for rotation therewith, and, as has been explained, incorporates a roller 268 at its lower end for engagement with the upper surface of the lift bar 262. It will also be noted with respect to FIG. 7 that the upper surface of frame member 144 may carry a skid plate 270 which may extend toward the conveyor 12 to facilitate transfer of the sod strips from the conveyor to the stacker 14.

The lift bar 262 is carried by an actuator rod 272 secured at its upper end to bar 262 and at its lower end to a hydraulic drive cylinder 274 which is actuable to control the position of the trap doors. The actuator rod 272 passes through a sleeve 276 and a crossbrace 278 which is a part of the stacker frame and which serves to guide the actuator in a vertical path. Secured to the crossbrace adjacent its outer ends are a pair of vertical braces 280 and 282 which serve as guides for the lift bar 262 to prevent it from rotating out of position. The operation of the hydraulic cylinder 274 is controlled, for example, by a solenoid valve 284 which is, in turn, regulated by the tripper switch 228. A timer, diagrammatically illustrated at 286, regulates the duration of cylinder operation so as to return the doors to their closed positions after a predetermined period of time. The cylinder 274 and valve 284 may conveniently be supported by means of a bracket 288 secured to crossbrace 278, or may otherwise be supported on the stacker frame.

In operation, when the sod is positioned on the trap doors, one or more of the trip arms 218 to 223 will be mechanically moved to actuate the tripper switch 228. This will operate the solenoid valve 284, causing cylinder 274 to draw lift bar 262 downwardly, as viewed in FIG. 6, thereby allowing all of the trap doors to swing downwardly about the axes of their respective hinge bars to form three sod-stacking chutes. The sod positioned on the doors by the sod pullers 180, 181 and 182 drops downwardly through the chutes onto a pallet. The timer 286 holds the doors open for approximately 0.2 seconds to allow the sod to clear the doors as it drops downwardly, and then causes the solenoid valve to reverse the operation of cylinder 274, driving the lift bar 262 upwardly against the lever arms 256 through 261, closing the doors to prepare the stacker to receive the next strips of sod.

The sod strip blocks which fall through the trap doors 138, 139 and 140 are directed onto the pallet 142 which is carried by a hydraulically actuated fork lift arrangement having a pair rearwardly extending lift tines 290 and 292, illustrated in FIGS. 2, 4 and 5. The fork lift may be secured in the stacker in any suitable manner, as long as it does not interfere with the movement of the sod. In a typical arrangement, tines are secured to a transversely extending beam 294 which is, in turn, carried by a plurality of vertical lift rods 296 through 299. The lift rods are secured at their upper ends to a hydraulically actuated lift beam 300 which extends across the width of the stacker and is mounted at its outside ends to a pair of hydraulic lifters 302 and 304. The lower ends of lifters 302 and 304 are supported on the stacker frame, as by means of suitable brackets 306 and 308, whereby actuation of the cylinders will raise the fork lift framework and thereby position pallet 142 at a desired level below the trapped doors 138 through 140.

In order to secure acurate stacking of the sod on pallet 142 it is desired that each strip of sod fall the same distance from the trap door to the stack being formed on the pallet. For this purpose, the stacking platform must continually be adjusted to maintain a constant distance between the top of the stack and the doors. Thug, the empty pallet is raised by the fork lift arrangement to a position just below the hinged doors, and is gradually lowered as the stacks build up. When the pallet is full, the fork lift is lowered to place the pallet on the ground where it may be removed from the stacker either by advancing the stacker or by means of a conventional fork lift truck. Although a preferred fork lift arrangment has been diagrammetically illustrated, it has not been shown in detail for purposes of clarity; however, various arrangements may be used without the departing from the present invention.

It has been found that the stacks of sod formed on pallet 142 may be somewhat unstable when the harvester is moving across the uneven surface of a field during a harvesting operation, and thus the pallets are often difficult to handle. Accordingly, the stacks preferably are secured on the pallet to prevent them from falling over. This may be accomplished in one of several ways. For example, the pallet may periodically be rotated 90° so that at least some of the blocks of sod are arranged at right angles to the stacks on the pallet to provide an interlock. However, the provision of a mechanism to accomplish such an arrangement is unduly complex, and the alternative of placing the pallet on the ground, lifting it out of the machine with a fork lift truck, turning it 90° and replacing it in the stacker is too time consuming. In accordance with a preferred embodiment of the invention, a much simplified arrangement for tying the stacks together has been provided. This arrangement incorporates a tie bar 310 on which is mounted a plurality of wound packages of twine 312, 313 and 314 (FIG. 4). The end of each length of twine is secured to one edge of the pallet, and the twine is passed across the pallet to underlie the three stacks of sod. After several blocks of sod have been placed on each stack, the twine is passed across the top of the stacks and additional blocks are placed thereon. Again, after several more blocks have been placed on each stack, the twine is passed back across the stacks in the opposite direction, and the process continues so that the twine is interwoven with the blocks of sod and extends back and forth across the several stacks. When the stacks have been completed, the end of the twine are tied together to hold the stacks together and facilitate the handling of the pallet.

To simplify the interweaving of the twine, the tie bar 310 is mounted at one end to a transversely extending shaft 316 by means of a linear motion sleeve bearing 318. The shaft 316 is secured between the corner posts 151 and 154 of the stacker frame by means of brackets 319 and 320 so that the tie bar 310 can be moved from one side of the pallet to the other by sliding the bearing along the length of shaft 316. The opposite, or free, end of the tie bar is provided with a notch which engages one or the other of a pair of studs 322 or 324, whereby the tie bar may be secured at either side of the stacker.

The system of the present invention thus provides a method and apparatus for automatically harvesting and stacking blocks of sod without the need for manual handling of the sod. Thus, the cutter assembly 10 includes means for undercutting three adjacent strips of sod as the harvester machine is driven forwardly either under its own power of by a suitable power source such as a tractor. The strips of sod are cut to the desired length by a cut off device mounted on the machine, the cut off device being coordinated with the motion of the machine so that the length of the sod strips is independent of variations in forward speed. The cut lengths of sod are picked up by a suitable scoop-like arrangement which guides the sod onto a conveyor assembly 12, and the sod is carried upwardly to a stacker assembly 14. A sod transporter which includes spikes mounted on an endless belt or chain assists in carrying the sod strips along the scoop-like arrangement onto the conveyor.

At the upper end of the conveyor assembly, the blocks of sod are engaged by a sod puller mechanism which slides the sod blocks across trap door plates which form the top surface of the stacker. The doors are held by a hydraulic lifter in a horizontal position until the sod is drawn by the sod puller into contact with a tripping arrangement which releases the doors by lowering the hydraulic lifter. The doors swing downwardly under the weight of the sod, dropping it down to corresponding stacks on a pallet located immediately below the doors and carried by a fork lift arrangement. As soon as the sod blocks clear the door plates, the hydraulic lifter is activated to engage lift arms secured to the doors to return the doors to their closed position in time to receive the next set of sod blocks. It will be noted that during this operation, the machine is continuously moving forward, and the location of the pallet with respect to the trap doors must be adjusted to take into account the forward motion of the machine as the sod drops down onto the pallet.

Thus, there has been described a new and improved method and apparatus for harvesting sod and automatically stacking it without the need for manual handling of the sod blocks. Although a preferred embodiment of the invention has been illustrated, it will be apparent that numerous modifications may be made without departing from the true spirit and scope thereof as defined in the following claims.

What is claimed is:

1. A stacking apparatus for automatically and continuously harvesting and stacking blocks of sod, comprising:
   cutter means for undercutting a continuous strip of sod for cutting said strip into blocks of sod;
   conveyor means for sequentially picking up and transporting blocks of sod;
   support means for receiving said blocks of sod from said conveyor, said support means including a normally closed, hinged door means adapted to pivot downwardly to an open position;
   positioner means adjacent said support means for automatically positioning blocks of sod received from said conveyor on said hinged door means;
   means for holding said door means in said closed position;
   tripper means responsive to the presence of a block of sod on said door means for releasing said door, allowing said door means to open to drop said block of sod;
   sod receiving means located beneath said support means, said receiving means including a platform vertically movable with respect to said door means to receive the block of sod released by the opening of said door means; and
   reset means for returning said door means to its normally closed position after the block of sod has been dropped on said platform to prepare said door means to receive the next block of sod in sequence from said conveyor, whereby said blocks are sequentially dropped on said platform to form a stack.

2. The apparatus of claim 1, wherein said means for holding said door in said closed position comprises actuator means selectively movable to engage and to close and open said door, said actuator means being responsive to said tripper means to open said door.

3. The apparatus of claim 2, wherein said reset means includes timer means for said actuator means for reclosing said door a preset time after it is opened.

4. The apparatus of claim 1, wherein said platform comprises a removable pallet supported by a vertically adjustable fork lift means.

5. The apparatus of claim 1, wherein said door means comprises a pair of hinged doors pivotally secured to said support means and normally closed to form a substantially horizontal surface for receiving said blocks of sod, said doors when opened forming a sod dropping chute for depositing blocks of sod on said platform.

6. The apparatus of claim 5, wherein said means for holding said doors in said closed position comprises hydraulic actuator means selectively movable to engage and close said doors and to disengage and allow said doors to open, said actuator means being responsive to said tripper means to open said doors.

7. The apparatus of claim 6, wherein said reset means comprises timer means for activating said hydraulic actuator means to urge said doors toward the closed position a predetermined time after said doors are opened.

8. The apparatus of claim 1, wherein said positioner means comprises a sod puller chain extending between said conveyor means and said hinged door means for propelling each block of sod from said conveyor onto said door means.

9. The apparatus of claim 8, wherein said sod puller chain is located above and closely adjacent said support means and includes a plurality of spikes adapted to engage the upper surface of said blocks of sod and to move each block of sod in turn across said door means and into contact with said tripper means.

10. The apparatus of claim 1, wherein said positioner means comprises a sod puller for advancing said sod blocks onto said door means.

11. The apparatus of claim 10, wherein said tripper means is located in the path of said sod blocks, so that when each block in turn is advanced completely onto said door means said tripper is activated to release said hinged doors.

12. The apparatus of claim 11, wherein said door means, when open, form a sod dropping chute for directing said sod blocks onto said platform.

13. The apparatus of claim 12, further including means for securing said stack of sod on said platform.

14. The sod stacking apparatus of claim 1, wherein said cutter means undercuts a plurality of side-by-side continuous strips and cuts each said strip into a sequence of blocks, said conveyor means including means for picking up and transporting corresponding side-by-side blocks of sod to said support and positioner means, said support means including door means for each of said side-by-side blocks, whereby a plurality of side-by-side stacks of sod are formed on said sod receiving means.

15. A method for automatically harvesting and stacking sod, comprising:
   undercutting a continuous strip of sod;
   cutting said strip into blocks of predetermined length;
   sequentially and automatically picking up and continuously transporting said blocks of sod upwardly along a conveyor to a support surface;
   sequentially propelling each of said blocks along said support surface and automatically locating each block on the upper surface of normally closed hinged door means to position said block for stacking;
   automatically opening said hinged door means to form a sod dropping chute when said block is correctly positioned thereon;
   depositing said block on a pallet located below said hinged door means;
   automatically closing said hinged door means a predetermined time after it has opened to prepare for the receipt of the next block in said sequence; and
   repetitively opening and closing said hinged door means upon receipt of said blocks of sod to stack said blocks automatically on said pallet.

16. The method of claim 15, wherein a plurality of adjacent strips of sod are undercut and cut into a plurality of side-by-side blocks, further including;
   conveying adjacent blocks side-by-side to said support surface;
   locating said adjacent blocks corresponding, side-by-side hinged door means; and
   automatically opening said side-by-side door means simultaneously to deposit said blocks in adjacent, corresponding stacks on said pallet.

* * * * *